(12) United States Patent
Chen et al.

(10) Patent No.: US 10,288,146 B2
(45) Date of Patent: May 14, 2019

(54) DUAL ECCENTRIC SHAFT DRIVING MECHANISM

(71) Applicant: National Taiwan Normal University, Taipei (TW)

(72) Inventors: Shun-Tong Chen, Taipei (TW); Wei-Yu Chou, Taipei (TW); Chao-Jung Chiang, Taipei (TW)

(73) Assignee: NATIONAL TAIWAN NORMAL UNIVERSITY, Taipei (TW)

( * ) Notice: Subject to any disclaimer, the term of this patent is extended or adjusted under 35 U.S.C. 154(b) by 0 days.

(21) Appl. No.: 15/893,172

(22) Filed: Feb. 9, 2018

(65) Prior Publication Data

US 2019/0093733 A1 Mar. 28, 2019

(30) Foreign Application Priority Data

Sep. 27, 2017 (TW) .............................. 106133103 A

(51) Int. Cl.
*F16F 15/22* (2006.01)
*B26D 5/08* (2006.01)
*F16H 7/02* (2006.01)

(52) U.S. Cl.
CPC ................ *F16F 15/22* (2013.01); *B26D 5/08* (2013.01); *F16H 7/023* (2013.01)

(58) Field of Classification Search
CPC ........ F16F 15/1407; F16F 15/20; F16F 15/22; F16F 15/223; F16F 15/265; F16F 15/268;
(Continued)

(56) References Cited

U.S. PATENT DOCUMENTS 5,177,386 A * 1/1993 Shimada ................. B06B 1/166
310/81
7,582,032 B2 * 9/2009 Manfredotti ............ B06B 1/166
244/1 N
(Continued)

FOREIGN PATENT DOCUMENTS

CN 2082731 8/1991
CN 2258239 7/1997
(Continued)

OTHER PUBLICATIONS

Machine translation of CN 2082731 U obtained on Nov. 14, 2018.*
Machine translation of CN 2258239 Y obtained on Nov. 14, 2018.*

*Primary Examiner* — Adam D Rogers

(57) ABSTRACT

A dual eccentric shaft driving mechanism comprises a motor, a first eccentric shaft, and a second eccentric shaft. The first eccentric shaft has a first eccentric portion. The second eccentric shaft has a second eccentric portion connected to the first eccentric shaft. The motor is connected to the first eccentric shaft for driving the first and the second eccentric shaft to rotate. Wherein, the first and the second eccentric shaft are connected to have a same rotating direction. A phase difference between the first and the second eccentric portion is maintained at 180 degrees. Compared to the prior art, a second centrifugal force generated by the rotation of the second eccentric shaft is balanced by a first centrifugal force generated by the rotation of the first eccentric shaft in the present invention. Therefore, the vibration generated in the operation of the present invention is drastically reduced.

6 Claims, 14 Drawing Sheets

(58) Field of Classification Search
CPC .......... B26D 5/08; B26D 5/086; F16H 7/023; B25D 11/12
USPC ............................. 74/570.1, 570.2, 570.21
See application file for complete search history.

(56) References Cited

U.S. PATENT DOCUMENTS 8,393,310 B2 * 3/2013 Tisch .................... F16F 15/267
123/192.2
8,714,127 B2 * 5/2014 Lee ...................... F16F 15/265
123/192.1

FOREIGN PATENT DOCUMENTS

| CN | 101004201 | 7/2007 | |
|----|-----------|--------|---|
| CN | 204737637 | 11/2015 | |
| EP | 2006572 A2 * | 12/2008 | ............ F16F 15/265 |
| FR | 2858034 A1 * | 1/2005 | .............. F16F 15/22 |

* cited by examiner

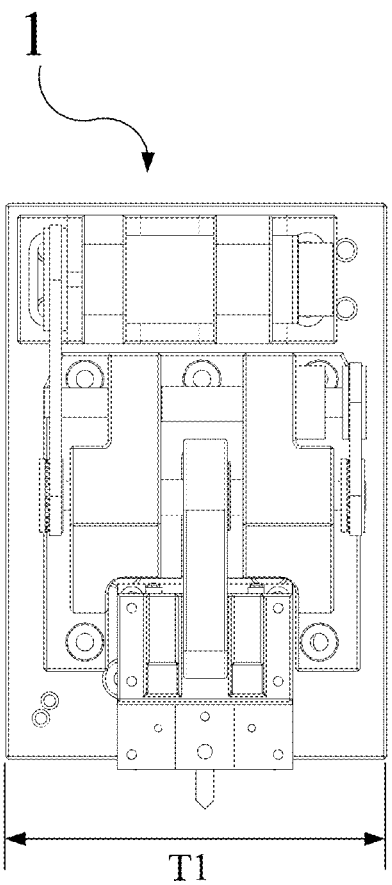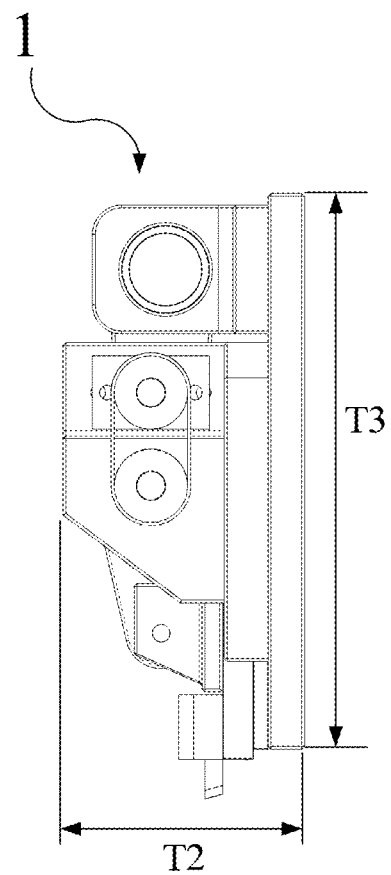
FIG. 1B
FIG. 1C

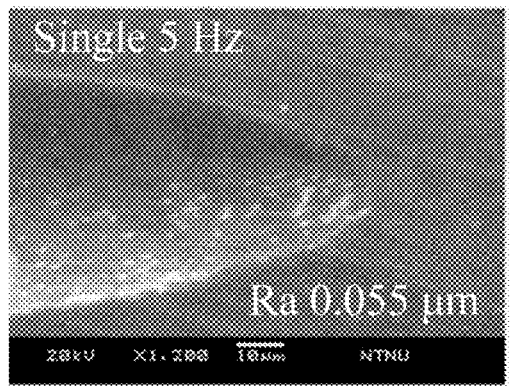 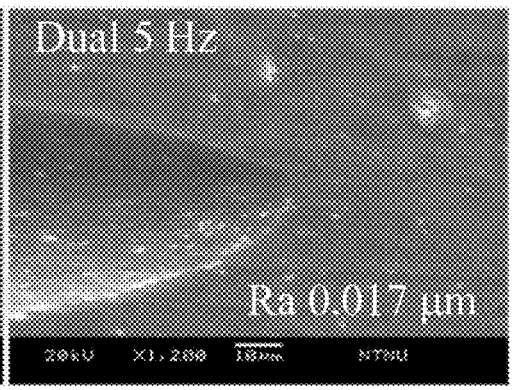
FIG. 6A　　　　　　　　FIG. 6B
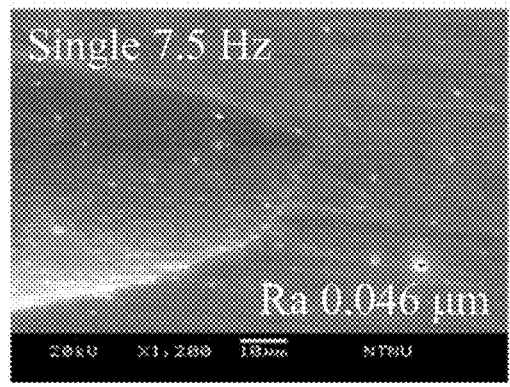 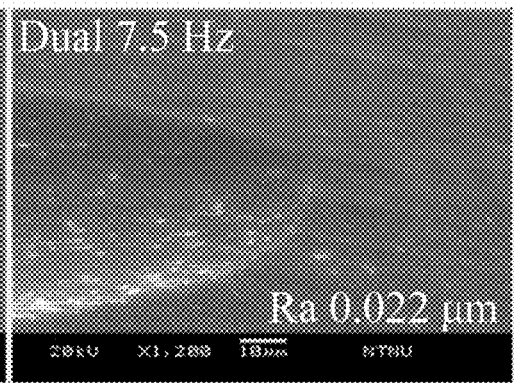
FIG. 6C　　　　　　　　FIG. 6D

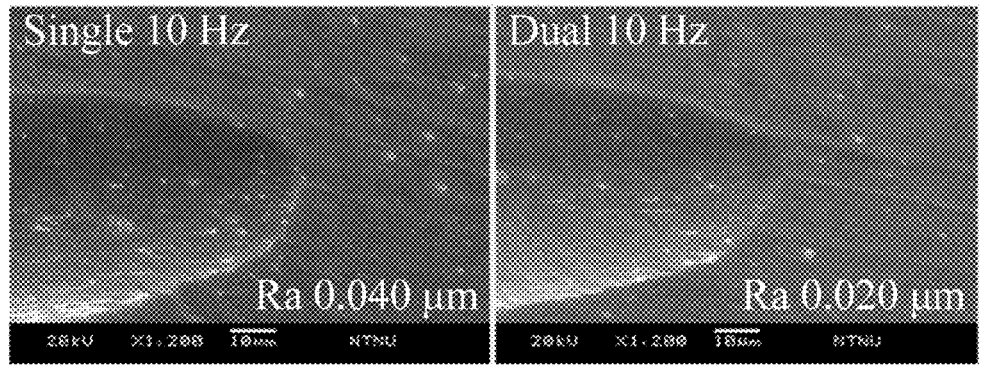
FIG. 7A                    FIG. 7B
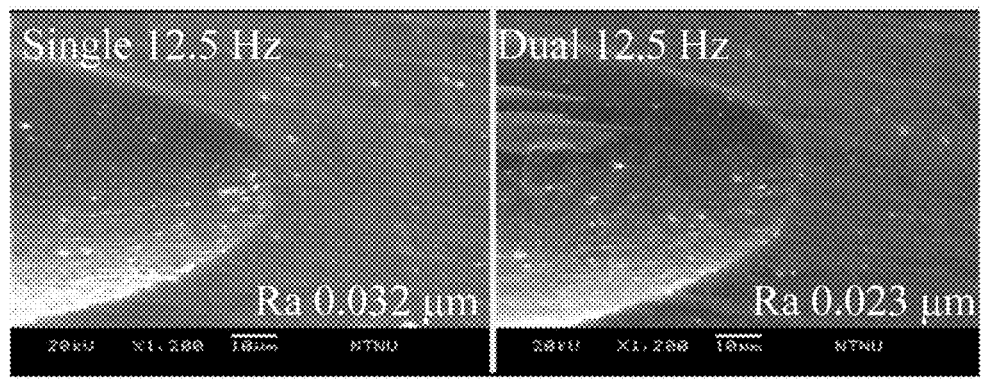
FIG. 7C                    FIG. 7D

DUAL ECCENTRIC SHAFT DRIVING MECHANISM

CROSS-REFERENCE TO RELATED APPLICATIONS

This application claims the priority benefit of Taiwan Application Ser. No. 106133103 filed Sep. 27, 2017 the disclosure of which is incorporated herein by reference.

BACKGROUND OF THE INVENTION

Field of the Invention

The present invention relates to a dual eccentric shaft driving mechanism, more particularly, to a driving mechanism configured a pair of eccentric shafts with a difference of 180 degree phase angle rotating in the same direction, so that the centrifugal force between the two eccentric shafts is balancing to reduce the vibration.

Description of the Prior

The high density surface microstructure array is a typical representative of the surface microstructure. Common features of the surface microstructure can be round, oval, concave or convex. Practical applications such as the precision array lens of optoelectronic industry, and cell culture array of biomedical industry. Besides, oil pool array of lathe high density micro scraping results in the oil filled evenly, increases lathe lubricity, and reduces surface friction. Moreover, high density surface microstructure array can be used in the hydrophobic pattern design of the electrochemical industry.

In prior art, the high density surface microstructure array is produced by ultra precision processing, laser beam processing, or micro-electro-mechanical processing technology. The mentioned processes are able to obtain a fast and high precision microstructure, but the cost and spending of implementing the process is high. Therefore, the mentioned processes are usually used for mass production.

SUMMARY OF THE INVENTION

In response to the above-mentioned problems, an object of the present invention is to provide a dual eccentric shaft driving mechanism. Through this invention, the high-frequency-likely reciprocating propulsion system is constructed with low process costs, so that the rapidly producing and processing of high-density surface microstructure arrays is provided.

The dual eccentric shaft driving mechanism of the present invention comprises a motor, a first eccentric shaft, and a second eccentric shaft. The first eccentric shaft connected to the motor has a first eccentric portion. The second eccentric shaft connected to the first eccentric shaft has a second eccentric portion. The motor is connected to the first eccentric shaft to drive the first eccentric shaft to rotate, and the second eccentric shaft is driven to rotate indirectly. Wherein, the first eccentric shaft and the second eccentric shaft are connected to have the same rotating direction, while the first eccentric shaft and the second eccentric shaft rotate, a phase difference between the first eccentric portion and the second eccentric portion is maintained at 180 degrees.

In an embodiment of the present invention, the first eccentric shaft and the second eccentric shaft have the same rotation speed.

In an embodiment of the present invention, the first eccentric shaft generates a first centrifugal force while rotating; the second eccentric shaft generates a second centrifugal force while rotating. The first centrifugal force is balanced with the second centrifugal force in the dual eccentric shaft driving mechanism.

In an embodiment of the present invention, the dual eccentric shaft driving mechanism further comprises a processing mechanism, wherein the processing mechanism is connected to the first eccentric portion to process a workpiece reciprocationally.

In an embodiment of the present invention, a surface roughness of a surface of the workpiece processed by the processing mechanism is less than or equal to Ra 0.025 μm, and a processing positional precision of the surface of the workpiece processed by the processing mechanism is less than or equal to 1 μm.

In an embodiment of the present invention, the processing mechanism is processed on a surface of the workpiece to produce a microstructure array comprising a plurality of microstructures. Wherein, a density of the microstructures in the microstructure array is greater than or equal to 22 pieces per $mm^2$.

In an embodiment of the present invention, a first eccentricity is between the rotation center of the first eccentric portion and the rotation center of the first eccentric shaft; a second eccentricity is between the rotation center of the second eccentric portion and the rotation center of the second eccentric shaft. The first eccentricity is equal to the second eccentricity.

In an embodiment of the present invention, the dual eccentric shaft driving mechanism further comprises a processing mechanism. Wherein, the processing mechanism is connected to the second eccentric portion to process a workpiece reciprocationally.

In an embodiment of the present invention, the motor is configured between the first eccentric shaft and the second eccentric shaft, or the second eccentric shaft is configured between the first eccentric shaft and the motor.

In an embodiment of the present invention, the motor is a servomotor. The connection among the motor, the first eccentric shaft, and the second eccentric shaft comprises a belt, a gear belt, and a gear.

Compare to the prior art, the present invention provides a dual eccentric shaft driving mechanism. Through this invention, the high-frequency-likely reciprocating propulsion system is constructed with low process costs, but the rapidly producing and processing of high-density surface microstructure arrays is provided. Through the design of the phase difference between the dual eccentric shafts, the equal but opposite centrifugal forces generated by each eccentric shaft are used to inhibit the vibration. Also, the servomotor is used to control the precise eccentric shaft positive process, so that the high-density surface microstructure is actually producing rapidly and precisely, and the autonomous technology of high-density surface microstructure array processing is developed.

BRIEF DESCRIPTION OF THE APPENDED DRAWINGS

Some of the embodiments will be described in detail, with reference to the following figures, wherein like designations denote like members, wherein:

FIG. 1A to FIG. 1C show a stereogram, a top view and a right view of an embodiment of the present invention respectively.

FIG. 6A to FIG. 6D and FIG. 7A to FIG. 7D show electron microscope photos of the surface roughness experimental results of the experiment controls and the embodiments of the present invention.

The advantages, spirits, and features of the present invention will be explained and discussed with embodiments and figures as follows.

DETAILED DESCRIPTION OF THE INVENTION

A detailed description of the hereinafter described embodiments of the disclosed apparatus and method are presented herein by way of exemplification and not limitation with reference to the Figures. Although certain embodiments are shown and described in detail, it should be understood that various changes and modifications can be made without departing from the scope of the appended claims. The scope of the present invention will in no way be limited to the number of constituting components, the materials thereof, the shapes thereof, the relative arrangement thereof, etc., and are disclosed simply as an example of embodiments of the present invention.

Figure 1A:
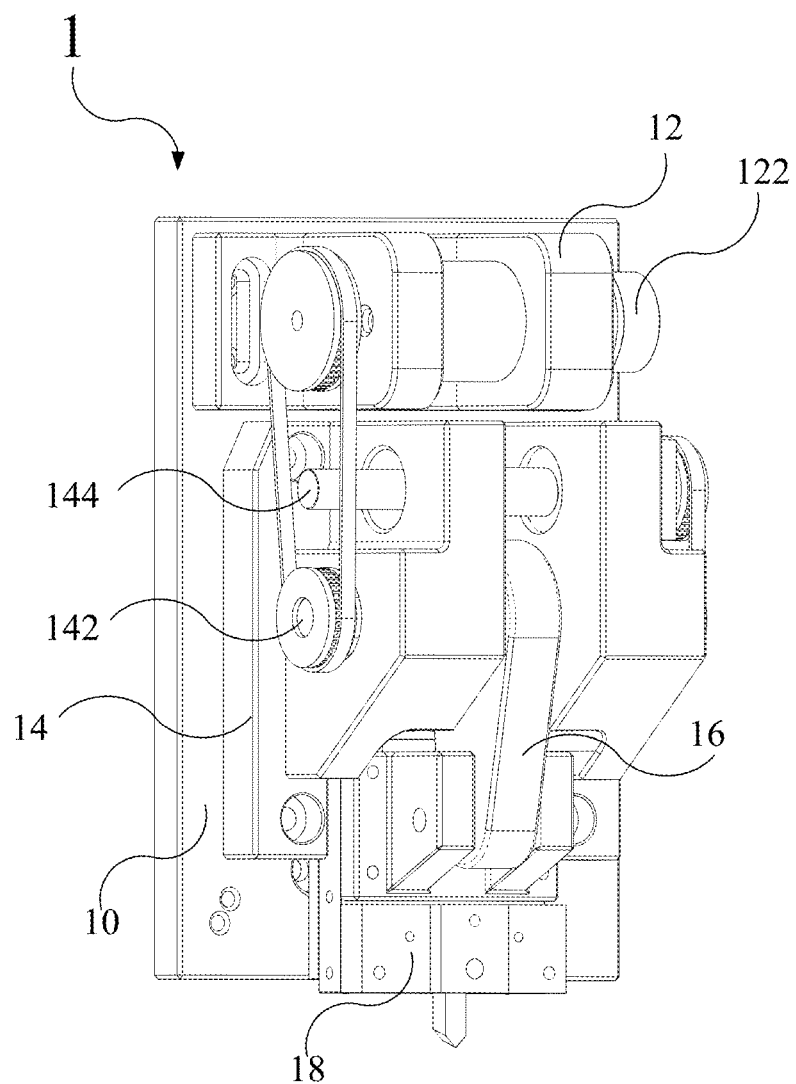
Figure 2:
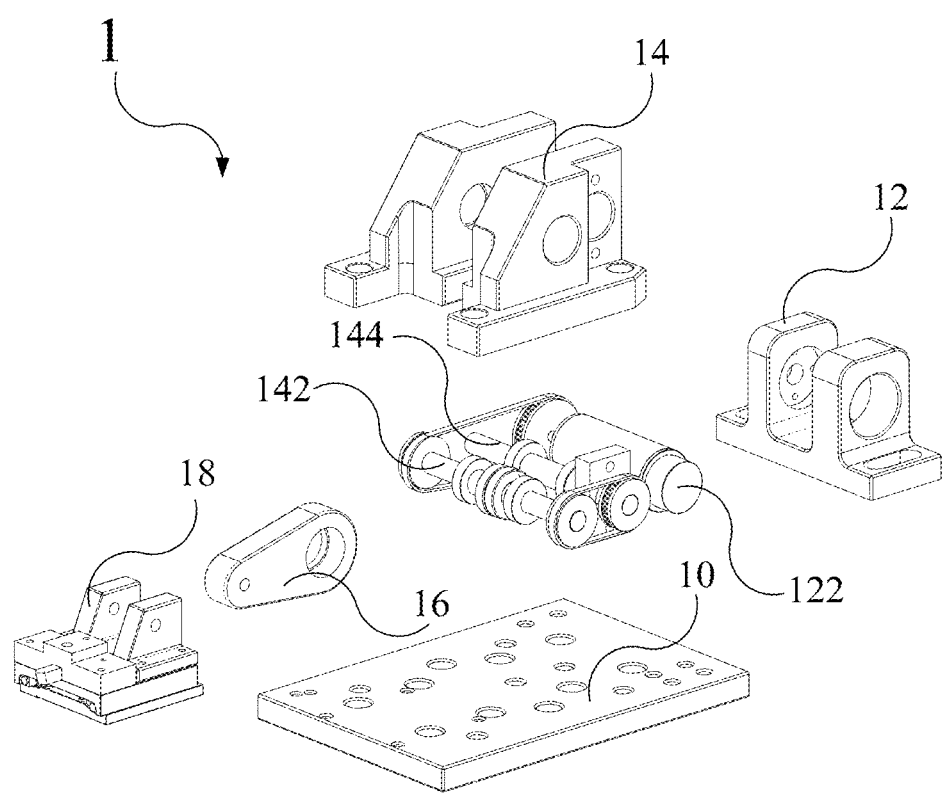
FIG. 2 shows an exploded diagram of an embodiment of the present invention.

Please refer to FIG. 1A to FIG. 1C and FIG. 2. FIG. 1A to FIG. 1C show a stereogram, a top view and a right view of an embodiment of the present invention respectively. FIG. 2 shows an exploded diagram of an embodiment of the present invention. The present invention provides a dual eccentric shaft driving mechanism to conduct the high-frequency-likely reciprocation. The dual eccentric shaft driving mechanism comprises a base 10, a motor seat 12, a motor 122, a bearing seat 14, a first eccentric shaft 142, a second eccentric shaft 144, a connecting rod 16, and a processing mechanism 18. The motor seat 12 is used to house and fix the motor 122 on the base 10. The first eccentric shaft 142 and the second eccentric shaft 144 are disposed in the bearing seat 14 in parallel to each other. The processing mechanism 18 is connected to the first eccentric shaft 142 through the connecting rod 16. The base 10 of the present invention is designed to be integrally formed with the advantages of increased rigidity and vibration reduction.

It should be noted that some drawings attached to the present invention are depicted in true proportions, so parameters such as size, proportion and absolute amount of each component should be regarded as existing in a part of the present invention. In addition, in order to clearly show the size and the absolute amount of the present invention, three lengths of T1, T2 and T3 are defined in FIG. 1B and FIG. 1C. In the preferred embodiment, the length T1 is 130 millimeters, the length T2 is 82.5 millimeters, and the length T3 is 190 millimeters.

In the embodiment, the second eccentric shaft 144 is configured between the first eccentric shaft 142 and the motor 122. However, the present invention is not limited thereto. The motor 122 may be configured between the first eccentric shaft 142 and the second eccentric shaft 144, as long as the first eccentric shaft 142 and the second eccentric shaft 144 can be driven by the motor 122 to rotate. In an embodiment, the connection way between the first eccentric shaft 142 and the motor 122, between the first eccentric shaft 142 and the second eccentric shaft 144, or between the motor 122 and the second eccentric shaft 144 may comprise a belt, a gear belt, and a gear.

Figure 3A:
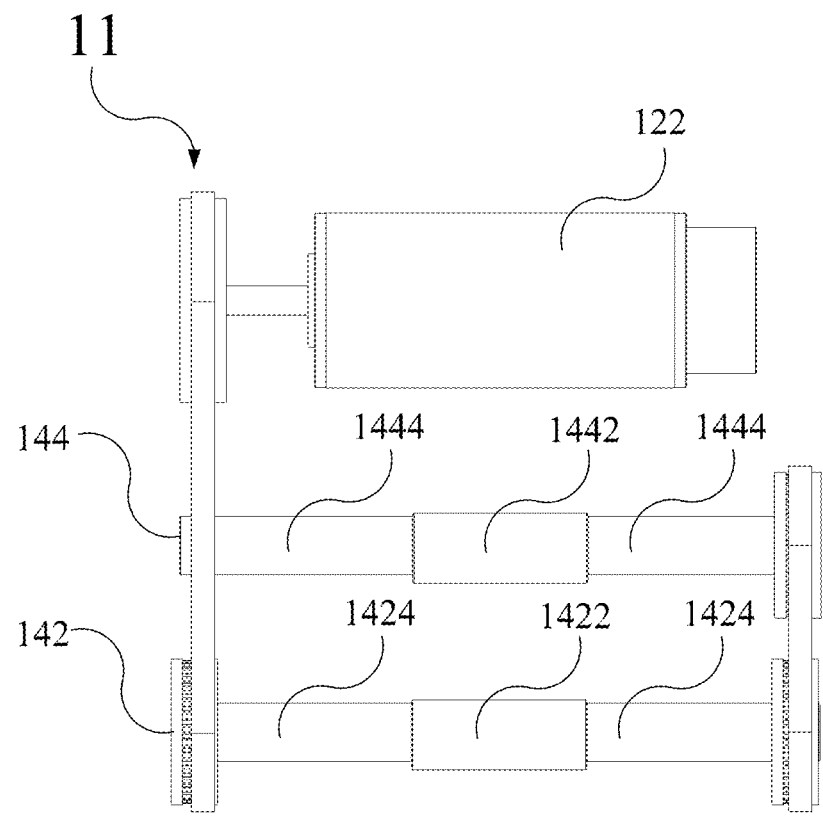
FIG. 3A shows a schematic diagram of the balancing device of an embodiment of the present invention.
Figure 3B:
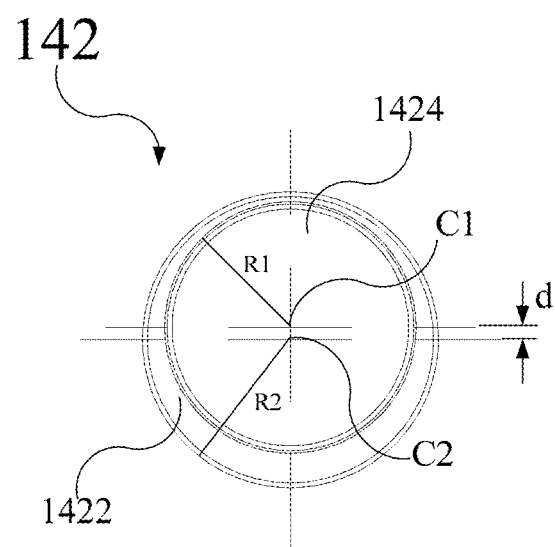
FIG. 3B shows a side view schematic diagram of the first eccentric shaft of an embodiment of the present invention.

Please refer to FIG. 3A and FIG. 3B. FIG. 3A shows a schematic diagram of the balancing device 11 of an embodiment of the present invention. FIG. 3B shows a side view schematic diagram of the first eccentric shaft 142 of an embodiment of the present invention. The dual eccentric shaft driving mechanism provided by the present invention comprises a balancing device 11. The balancing device 11 is made of the motor 122, the first eccentric shaft 142, the second eccentric shaft 144, and the connection way mentioned above. In the present embodiment, the connection ways mentioned above are the gear belt and the gear. The first eccentric shaft comprises a first eccentric portion 1422 and a first supporter 1424. The first supporter 1424 is configured through the base 10. In the present embodiment, the two ends of the first eccentric portion 1422 are respectively configured one first supporter 1424. That is, the first eccentric portion 1422 is configured in the middle of the first eccentric shaft 142. A diameter R2 of the first eccentric portion 1422 is greater than a diameter R1 of the first supporter 1424. There is a first eccentricity d between the rotation centre C1 of the first supporter 1424 and the rotation centre C2 of the first eccentric portion 1422. While the first eccentric shaft 142 is driven to rotate by the motor 122, the first eccentric portion 1422 eccentrically rotate corresponding to the first eccentric shaft 142, so that the connecting rod 16 and the processing mechanism 18 is driven to process reciprocationally. For example, when the processing mechanism 18 comprises a cutting cutlery, the processing mechanism 18 processes and cuts a workpiece reciprocationally.

It should be noted that since the diameter R2 of the first eccentric portion 1422 is greater than the diameter R1 of the first supporter 1424 and the first eccentricity d is between the rotation centre C1 of the first supporter 1424 and the rotation centre C1 of the first eccentric portion 1422, the first centrifugal force is generated while the first eccentric portion 1422 eccentrically rotates. The processing mechanism 18 happens to vibrate because of the first centrifugal force. However, this vibration is not necessary for precision machining. Therefore, in order to decrease the vibration made by the first centrifugal force, the present invention is designed to use a second centrifugal force generated by the second eccentric shaft 144. The first centrifugal force generated by the first eccentric shaft 142 is balanced by the second centrifugal force. Therefore, the vibration generated by the rotation of the first eccentric shaft 142 is decreased in dual eccentric shaft driving mechanism of the present invention.

Please refer to FIG. 3A continuously. In an embodiment, the second eccentric shaft 144 comprises a second eccentric portion 1442 and a second supporter 1444. The second supporter 1444 is configured through the base 10. In the present embodiment, the two ends of the second eccentric portion 1442 are respectively configured with one second supporter 1444. That is, the second eccentric portion 1442 is configured in the middle of the second eccentric shaft 144. In the present embodiment, the appearance, size, and parameters of the second eccentric shaft 144 are the same with the first eccentric shaft 142, so the appearance, size, and parameters of the first eccentric shaft 144 is adopted in the following. A diameter R2 of the second eccentric portion 1442 is greater than a diameter R1 of the second supporter 1444. An eccentricity d is between the rotation centre C1 of the second supporter 1444 and the rotation centre C1 of the second eccentric portion 1442. In order to achieve the balance between the first centrifugal force and the second centrifugal force, the first centrifugal force and the second centrifugal force are maintained at the equal force but opposite directions.

Wherein, the centrifugal force is calculated as $F=(m \times (d\omega)^2)/d$. In the present embodiment, F stands for centrifugal force, d stands for eccentricity, m stands for the mass of the eccentric portion, and $\omega$ stands for the angular velocity when the eccentric shaft rotates. Since the appearance, size, and parameters of the second eccentric shaft 144 are the same with the first eccentric shaft 142, the mass m and the eccentricity d of the first eccentric portion 1422 and second eccentric portion 1442 are equal. Therefore, if the angular velocity $\omega$ are equal while the first eccentric shaft 142 or the second eccentric shaft 144 rotates, the force between the first centrifugal force and the second centrifugal force will be equal, too. However, in order to make the direction of the first centrifugal force and the second centrifugal force opposite, the present invention provides the phase difference at 180 degrees of the first eccentric portion 1422 and second eccentric portion 1442 while rotating to make the direction of the first centrifugal force and the second centrifugal force opposite.

Please refer to FIG. 4A to FIG. 4D. FIG. 4A to FIG. 4D show a schematic diagram of the balance of the balancing device of an embodiment of the present invention, wherein the dotted line indicates the connecting belt between the first eccentric shaft 142 and the second eccentric shaft 144. In the present embodiment, the force direction is along with the connection of the rotation centre C1 of the first supporter 1424 and the rotation centre C2 of the first eccentric portion 1422 and is away from the rotation centre C1 of the first supporter 1424. Therefore, in order to make the direction of the first centrifugal force and the second centrifugal force opposite, except the rotating direction of the first eccentric portion 1422 and the second eccentric portion 1442 should be the same, the phase difference between the first eccentric portion 1422 and the second eccentric portion 1442 should be maintained at 180 degrees, too.

Figure 4A:
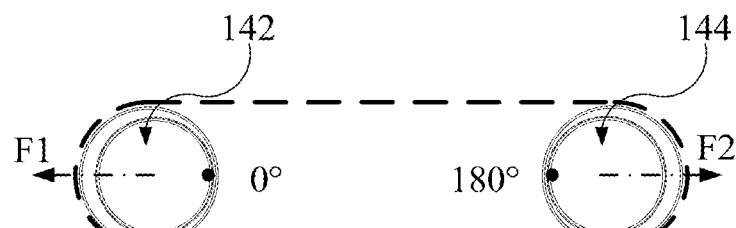
FIG. 4A to FIG. 4D show a schematic diagram of the balance of the balancing device of an embodiment of the present invention.

As shown in FIG. 4A, in the present embodiment, The 0 phase angle is defined while the rotation centre C2 of the first eccentric portion 1422 is located at the left side of the rotation centre C1 of the first supporter 1424, and the first eccentric shaft 142 at 0 phase angle is connected with the second eccentric shaft 144 at 180 phase angle. In order to facilitate the schematic diagram, a dot and captions for identifying the current phase angle of the first eccentric shaft 142 and the second eccentric shaft 144 are added in the FIG. 4A to FIG. 4D.

Figure 4B:
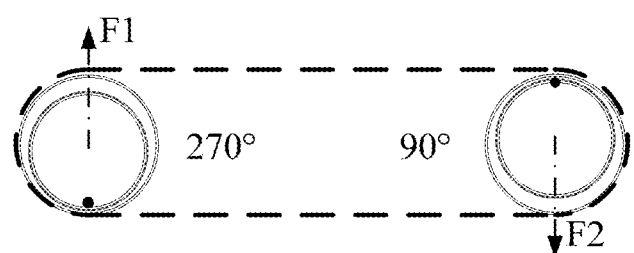

As shown in FIG. 4B, while the first eccentric portion 1422 and the second eccentric portion 1442 rotate a quarter turn clockwise, the phase angle of the first eccentric shaft 142 is at 270 phase angle and the phase angle of the second eccentric shaft 144 is at 90 phase angle. At this moment, the first centrifugal force F1 generated by the first eccentric portion 1422 on the first eccentric shaft 142 is directed upward of the schematic diagram, and the second centrifugal force F2 generated by the second eccentric portion 1442 on the second eccentric shaft 144 is directed downward of the schematic diagram.

Figure 4C:
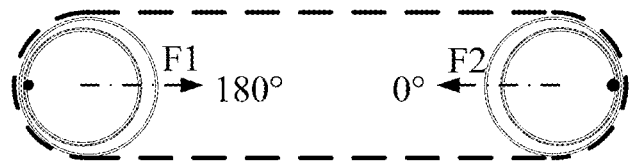

As shown in FIG. 4C, while the first eccentric portion 1422 and the second eccentric portion 1442 rotate a quarter turn clockwise again, the phase angle of the first eccentric shaft 142 is at 180 phase angle and the phase angle of the second eccentric shaft 144 is at 0 phase angle. At this moment, the first centrifugal force F1 generated by the first eccentric portion 1422 on the first eccentric shaft 142 is directed to the right of the schematic diagram, and the second centrifugal force F2 generated by the second eccentric portion 1442 on the second eccentric shaft 144 is directed to the left of the schematic diagram.

Figure 4D:
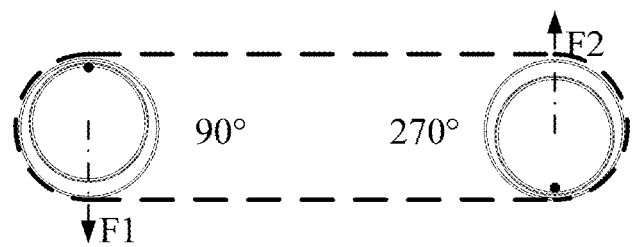

As shown in FIG. 4D, while the first eccentric portion 1422 and the second eccentric portion 1442 rotate a quarter turn clockwise again, the phase angle of the first eccentric shaft 142 is at 90 phase angle and the phase angle of the second eccentric shaft 144 is at 270 phase angle. At this moment, the first centrifugal force F1 generated by the first eccentric portion 1422 on the first eccentric shaft 142 is directed downward of the schematic diagram, and the second centrifugal force F2 generated by the second eccentric portion 1442 on the second eccentric shaft 144 is directed upward of the schematic diagram.

Eventually, as shown in FIG. 4A, while the first eccentric portion 1422 and the second eccentric portion 1442 rotate a circle clockwise, the phase angle of the first eccentric shaft 142 is at 0 phase angle and the phase angle of the second eccentric shaft 144 is at 180 phase angle again. At this moment, the first centrifugal force F1 generated by the first eccentric portion 1422 on the first eccentric shaft 142 is directed to the left of the schematic diagram, and the second centrifugal force F2 generated by the second eccentric portion 1442 on the second eccentric shaft 144 is directed to the right of the schematic diagram.

According to FIG. 4A to FIG. 4D and the description above, it can be seen that if the phase difference between the first eccentric portion 1422 and the second eccentric portion 1442 is maintained at 180 degrees while rotating, the directions of the first centrifugal force F1 and the second centrifugal force are maintained opposite. Because of the 180 degrees of the phase difference between the first eccentric portion 1422 and the second eccentric portion 1442, the dual eccentric shaft driving mechanism of the present invention drastically reduces the operation vibration, so as to keep the processing accuracy and the processing result stable.

Compared to the single eccentric shaft driving mechanism of the prior art, the inventor also conducted experiments to prove that the dual eccentric shaft driving mechanism 1 provided by the present invention has a better processing performance. The inventor designs an experiment platform. The experiment platform is a high-frequency-likely reciprocating propulsion mechanism utilizing the dual eccentric shaft driving mechanism of the present invention to process. Wherein the workpiece ready for processing is configured on a platform able to rotate and move along with the X-Y plane direction. The dual eccentric shaft driving mechanism 1 of the present invention is suspended above the workpiece and moves in the Z direction.

The setting experimental parameters include the first eccentricity and the second eccentricity set to 20 μm, the drive mechanism idling simulation frequency includes: 5~40 Hz, actual processing with the workpiece of the frequency includes: 5 Hz, 7.5 Hz, 10 Hz, 12 Hz. The experiment time is two minutes each time.

The experimental methods include the following: The experiment platform comprising the high-frequency-likely reciprocating propulsion mechanism of the present invention is used to conduct a driving position error analysis in idling in three directions of X-axis, Y-axis, and Z-axis. Program a driver comprising the three-axis motion processing path to conduct the driving position error analysis in idling. Make the present invention process to the workpiece according to the mentioned driver.

Figure 5A:
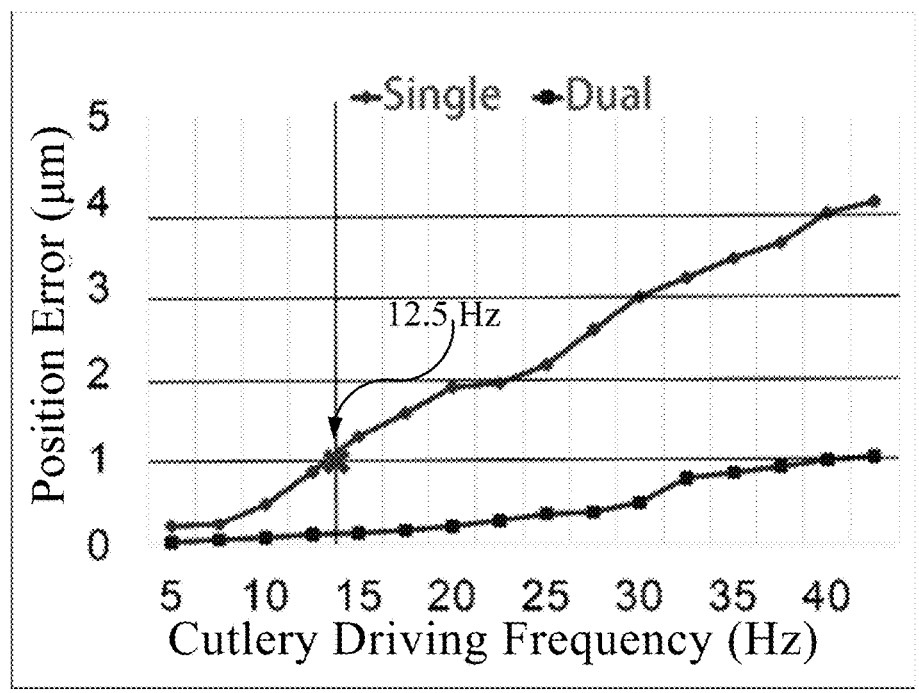
FIG. 5A shows an error comparison analysis diagram of the cutlery driving and the position error of the Z-axis system of an embodiment of the present invention.
Figure 5B:
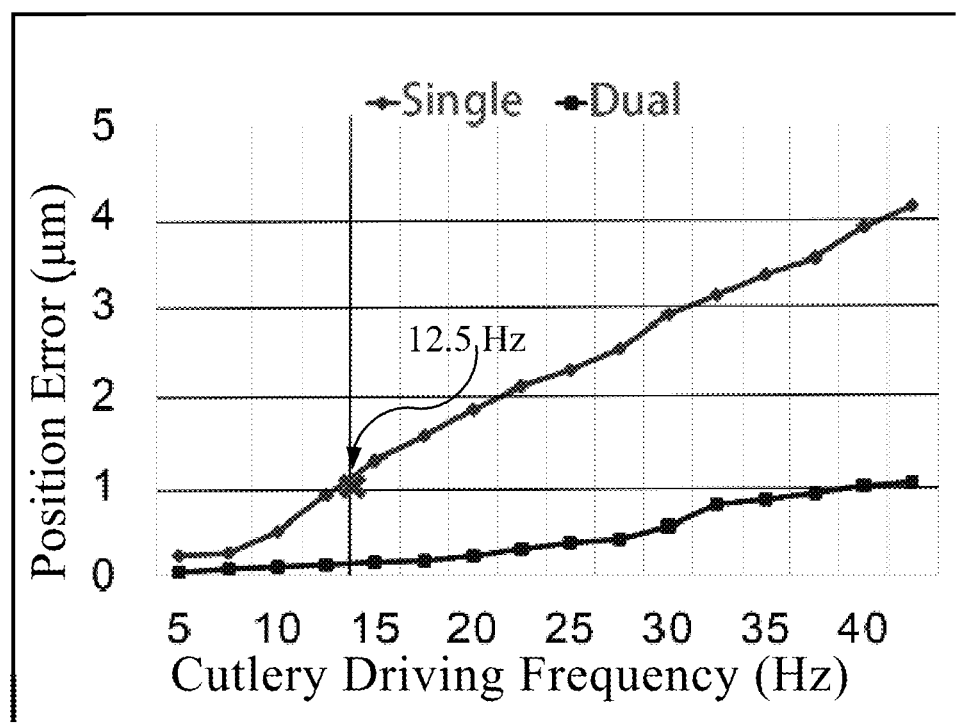
FIG. 5B shows an error comparison analysis diagram of the cutlery driving and the program execution position error of the Z-axis system of an embodiment of the present invention.

Please refer to FIG. 5A and FIG. 5B. FIG. 5A shows an error comparison analysis diagram of the cutlery driving and the position error of the Z-axis system of an embodiment of the present invention. FIG. 5B shows an error comparison analysis diagram of the cutlery driving and the program execution position error of the Z-axis system of an embodiment of the present invention. The result of the single eccentric shaft driving mechanism as a control is represented by the line segments with round dots, and the result of the dual eccentric shaft driving mechanism is represented by the line segments with square dots. The horizontal axis is the cutlery driving frequency (Hz) and the vertical axis is the position error (μm). As shown in FIG. 5A and FIG. 5B, while the cutlery driving frequency goes up, the position error of the single eccentric shaft driving mechanism increases fast and linearly; on the other hand, the position error of the dual eccentric shaft driving mechanism increases in a relatively flat trend. For example, while the cutlery driving frequency of the single eccentric shaft driving mechanism is 12.5 Hz, the position error is 1 μm. However, the position error achieves 1 μm while the cutlery driving frequency of the dual eccentric shaft driving mechanism is 40 Hz. While the first eccentric shaft is the main shaft of the driving mechanism, the second eccentric shaft is the balancing shaft to balance the first eccentric shaft. The design of the dual eccentric shaft driving mechanism mentioned above is effectively and drastically decreasing the vibration generated by the eccentric shaft, and the present invention is suitable for high-frequency processing.

Figure 8:
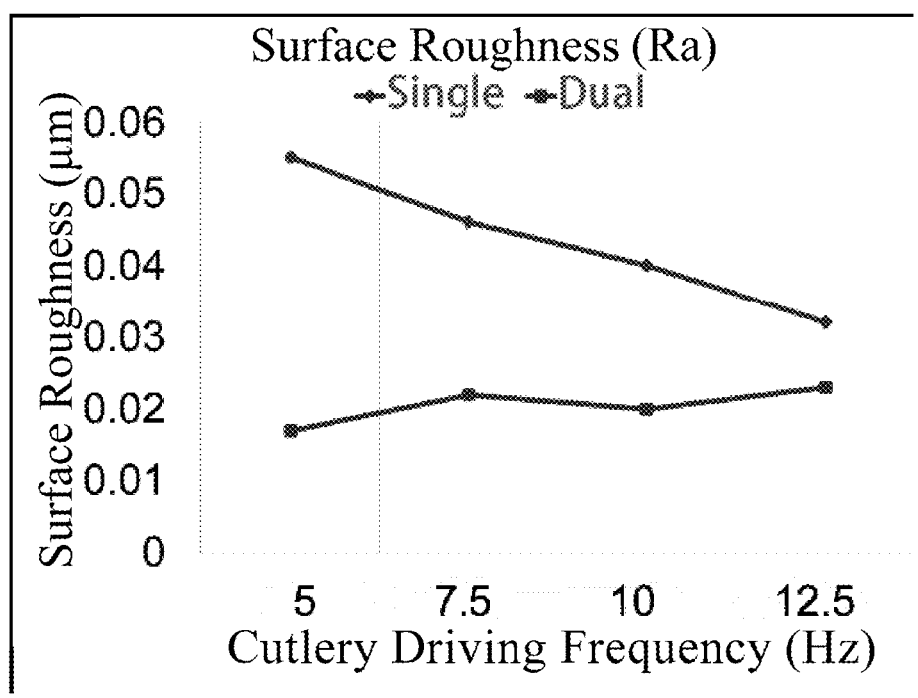
FIG. 8 shows a surface roughness analysis diagram of the experiment controls and the embodiments of the present invention.

Please refer to FIG. 6A to FIG. 6D and FIG. 7A to FIG. 7D. FIG. 6A to FIG. 6D and FIG. 7A to FIG. 7D show electron microscope photos of the surface roughness experimental results of the experiment controls and the embodiments of the present invention. In the experiments of making the present invention process to the workpiece, the fiber reinforced plastics (FRP) is the workpiece, and the processing mechanism is the diamond cutlery. The conducting driving frequency in processing comprises 5 Hz, 7.5 Hz, 10 Hz, and 12.5 Hz. The single eccentric shaft driving mechanism is served as experimental control to compare with the dual eccentric shaft driving mechanism, and the experimental graphs are analyzed to compare the surface roughness Ra. The result is summarized and described in the FIG. 8. FIG. 8 shows a surface roughness analysis diagram of the experiment controls and the embodiments of the present invention.

As shown in FIG. 8, in the processing result of the single eccentric shaft driving mechanism, the surface roughness is easily influenced by the cutlery driving frequency. On the other hand, the processing result of the surface roughness of the dual eccentric shaft driving mechanism is more consistent in four different cutlery driving frequencies. That is to say, the dual eccentric shaft driving mechanism 1 provided by the present invention has a consistent processing quality in varies kinds of cutlery driving frequencies.

Figure 9A:
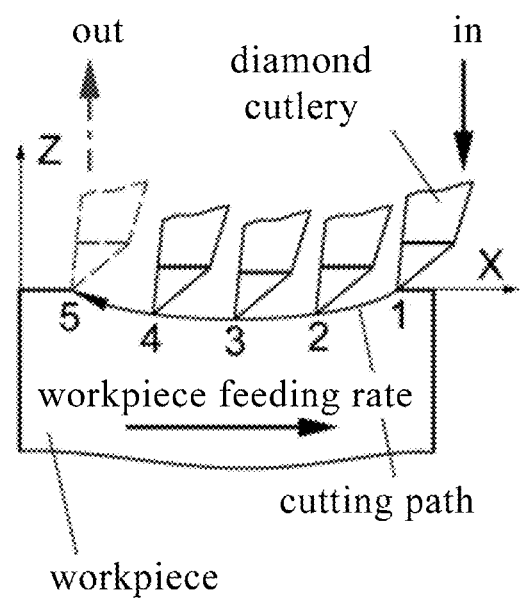
FIG. 9A shows a schematic diagram of the processing cutlery working on a workpiece surface.
Figure 9B:
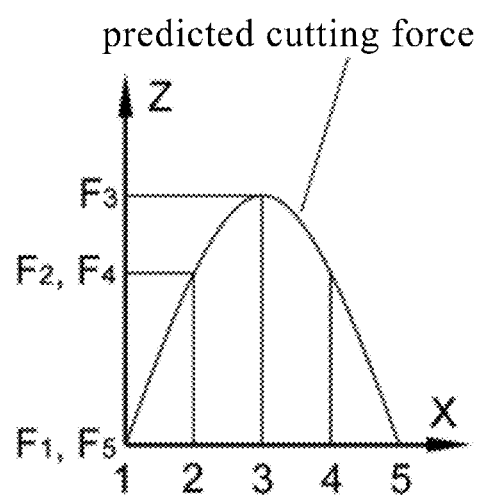
FIG. 9B shows an explanatory diagram of the cutting force loading analysis of the processing cutlery according to the processing of FIG. 9A.

Furthermore, the inventor analyzed the cutting force loading analysis. The single eccentric shaft driving mechanism is served as experimental control to compare with the dual eccentric shaft driving mechanism again. Please refer to FIG. 9A and FIG. 9B. FIG. 9A shows a schematic diagram of the processing cutlery working on a workpiece surface. FIG. 9B shows an explanatory diagram of the cutting force loading analysis of the processing cutlery according to the processing of FIG. 9A. The first thing to note is that during machining, when the processing cutlery contacts the workpiece, the forces on the processing cutlery are related to the cutting path and the cutting depth. As shown in FIG. 9A, while the diamond cutlery processes to the workpiece in the cutting path 1~5, the cutting force loading of the diamond cutlery is as shown in FIG. 9B.

While the cutlery contacts the workpiece in the path point 1, the cutting force loading is zero because the cutting has not yet started. While the cutting path of the feed as well as the increase of the cutting depth, the cutting force loading is increased. It also means the cutting force loading is increased from the path point 1 to the path point 3, and the cutting force loading comes to a maximum while the cutting depth comes to the deepest. Then with the cutting path of the feed as well as the decrease of the cutting depth, the cutting force loading is increased. It also means the cutting force loading is decreased from the path point 3 to the path point 5, and the cutting force loading comes to zero while cutting is finished in the path point 5. Therefore, in a cutting processing process, the cutting force loading is as shown in FIG. 9B.

Figure 10A:
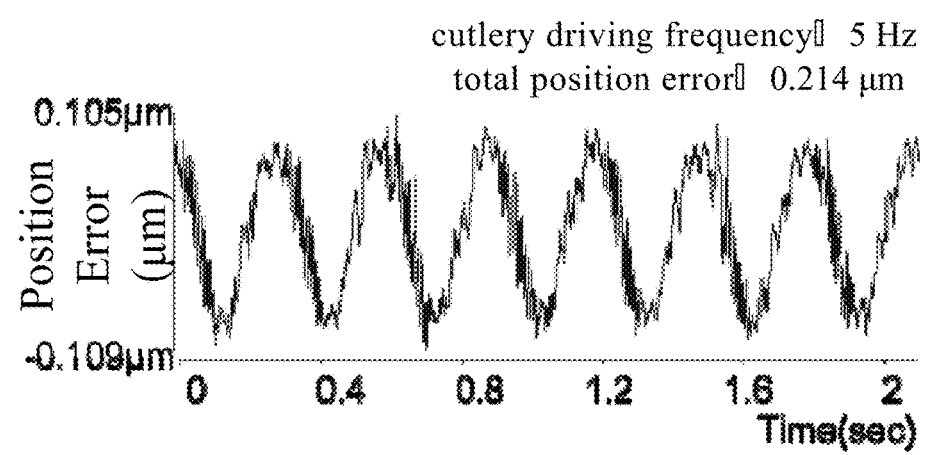
FIG. 10A and FIG. 10B show analysis diagrams of the cutting force loading analysis result between the experiment controls and the embodiments of the present invention.
Figure 10B:
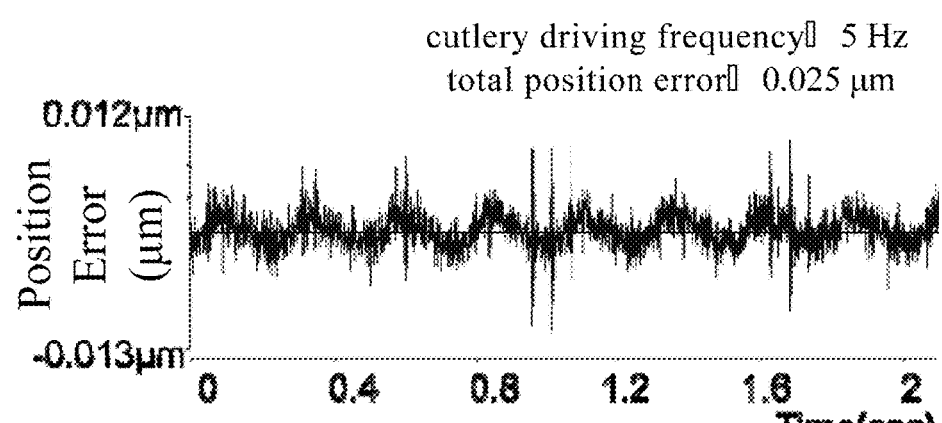

Please refer to FIG. 10A and FIG. 10B. FIG. 10A and FIG. 10B show analysis diagrams of the cutting force loading analysis result between the experiment controls and the embodiments of the present invention. Wherein the result of the single eccentric shaft driving mechanism is served as experimental control in FIG. 10A; and FIG. 10B shows the experimental results of the cutting force loading analysis of the dual eccentric shaft driving mechanism in an embodiment of the present invention. The analysis result of FIG. 10A to FIG. 10B can be interpreted after reading the contents of the above description and the contents of FIG. 9A to FIG. 9B. Wherein, the processed workpiece is oxygen-free copper (OFC), and the feeding frequency is 5 Hz. The cutlery processing direction is represented by the Z-axis. The cutting force loading is analyzed in 2 second processing period. In the cutting force loading analysis as shown in FIG. 10A, the position error is drastic in Z-axis, and the total position error is 0.214 μm. On the other hand, in the cutting force loading analysis as shown in FIG. 10B, the position error is relatively gentle in Z-axis, and the total position error is 0.025 μm.

Figure 11:
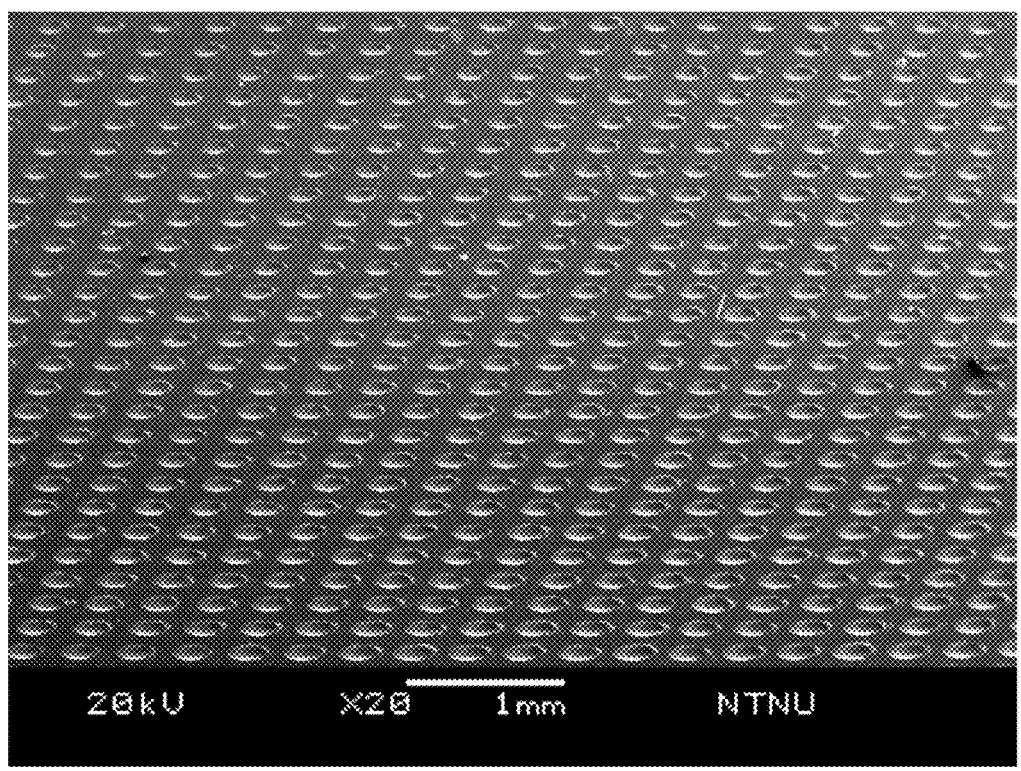
FIG. 11 shows electron microscope photos of the experiment result of processing in practice of an embodiment of the present invention.

The above experimental results show that in the field of high-frequency precision processing, the dual eccentric shaft driving mechanism 1 of the present invention has the effect of decreasing the vibration of system, decreasing the position error, maintaining the consistent surface roughness for processing quality compared to the single eccentric shaft driving mechanism. Please refer to FIG. 11. FIG. 11 shows electron microscope photos of the experiment result of processing in practice of an embodiment of the present invention. The dual eccentric shaft driving mechanism 1 of the present invention can be used to process a microstructure array. The mentioned microstructure array can be composed of 27×40 microstructures in the area of 6×8 mm². That is, the density of the microstructure is more than 22 microstructures/mm² in the microstructure array processed by the dual eccentric shaft driving mechanism 1 of the present invention.

In summary, the present invention provides a dual eccentric shaft driving mechanism comprising a motor, a first eccentric shaft, a second eccentric shaft, and a processing mechanism. The motor is connected to the first eccentric shaft, and the first eccentric shaft is connected to the second eccentric shaft, so that the motor can drive the first eccentric shaft and the second eccentric shaft to rotate. The first eccentric shaft is further connected to the processing mechanism to drive the processing mechanism to process. Wherein, the first eccentric shaft and the second eccentric shaft are connected at 180 degrees phase angle, and are maintained at the same speed and in the same direction. Therefore, through the first centrifugal force generated by the first eccentric shaft is balanced by the second centrifugal force generated by the second eccentric shaft, the vibration generated by the rotation is inhibited in dual eccentric shaft driving mechanism.

Compare to the prior art, the present invention provides a dual eccentric shaft driving mechanism. Through this invention, the high-frequency-likely reciprocating propulsion system is constructed with low process costs, but the rapidly producing and processing of high-density surface microstructure arrays is provided. Through the design of the phase difference between the dual eccentric shafts, the equal but opposite centrifugal forces generated by each eccentric shaft are used to inhibit the vibration. Also, the servomotor is used to control the precise eccentric shaft positive process, so that the high-density surface microstructure is actually producing rapidly and precisely, and the autonomous technology of high-density surface microstructure array processing is developed.

With the examples and explanations mentioned above, the features and spirits of the invention are hopefully well described. More importantly, the present invention is not limited to the embodiment described herein. Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A dual eccentric shaft driving mechanism, comprising:
   a motor;
   a first eccentric shaft, connected to the motor, having a first eccentric portion;
   a second eccentric shaft, connected to the first eccentric shaft, having a second eccentric portion; and
   a processing mechanism, connected to the first eccentric portion to process a workpiece reciprocatively
   wherein the first eccentric shaft and the second eccentric shaft are connected to have the same rotating direction, while the first eccentric shaft and the second eccentric shaft rotate, a phase difference between the first eccentric portion and the second eccentric portion is maintained at 180 degrees.

2. The dual eccentric shaft driving mechanism of claim 1, wherein the first eccentric shaft and the second eccentric shaft have the same rotation speed.

3. The dual eccentric shaft driving mechanism of claim 1, wherein the first eccentric shaft generates a first centrifugal force while rotating, the second eccentric shaft generates a second centrifugal force while rotating, and the first centrifugal force is balanced with the second centrifugal force in the dual eccentric shaft driving mechanism.

4. The dual eccentric shaft driving mechanism of claim 1, wherein a first eccentricity is between the rotation center of the first eccentric portion and the rotation center of the first eccentric shaft, a second eccentricity is between the rotation center of the second eccentric portion and the rotation center of the second eccentric shaft, and the first eccentricity is equal to the second eccentricity.

5. The dual eccentric shaft driving mechanism of claim 1, wherein the motor is configured between the first eccentric shaft and the second eccentric shaft, or the second eccentric shaft is configured between the first eccentric shaft and the motor.

6. The dual eccentric shaft driving mechanism of claim 1, wherein the motor is a servomotor, and the connection among the motor, the first eccentric shaft, and the second eccentric shaft comprises a belt, a gear belt, and a gear.

* * * * *